Dec. 5, 1961   B. G. COPPING   3,011,667
FULL DEPTH BOTTLE UNCASER
Filed June 10, 1957   6 Sheets-Sheet 1
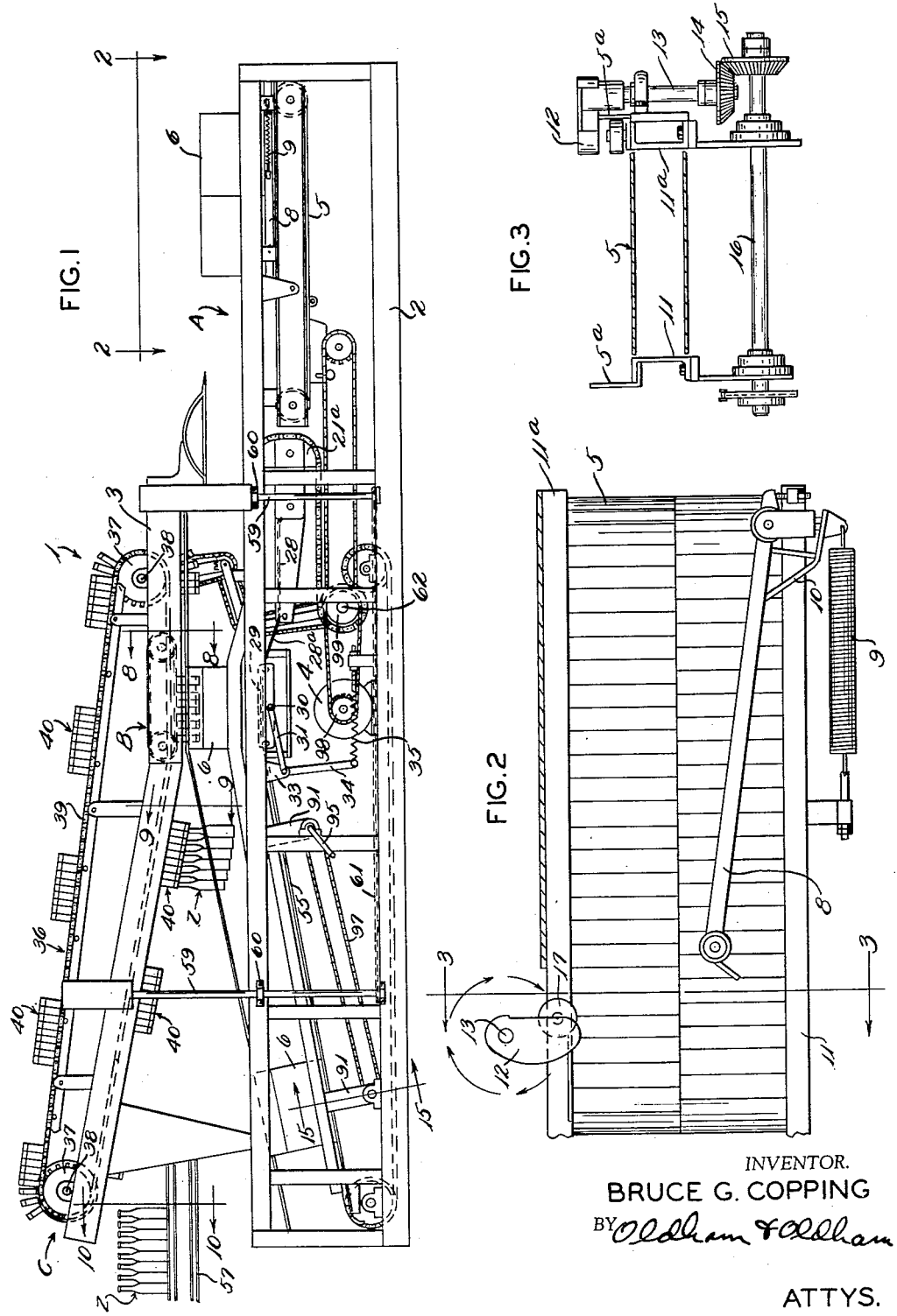
INVENTOR.
BRUCE G. COPPING
BY Oldham & Oldham
ATTYS.

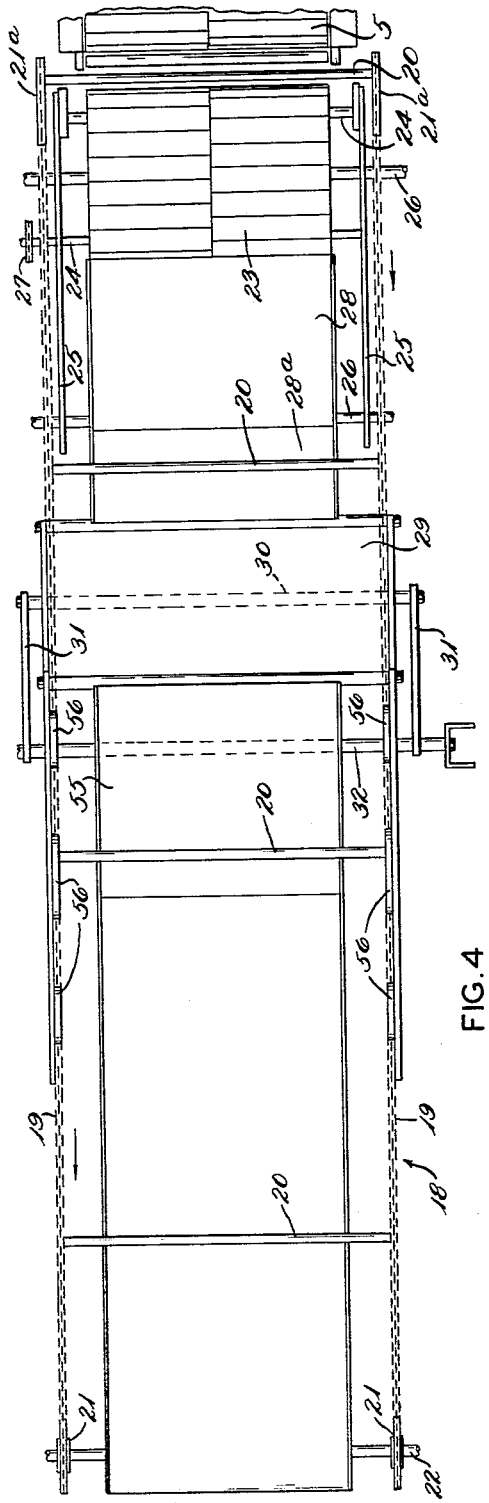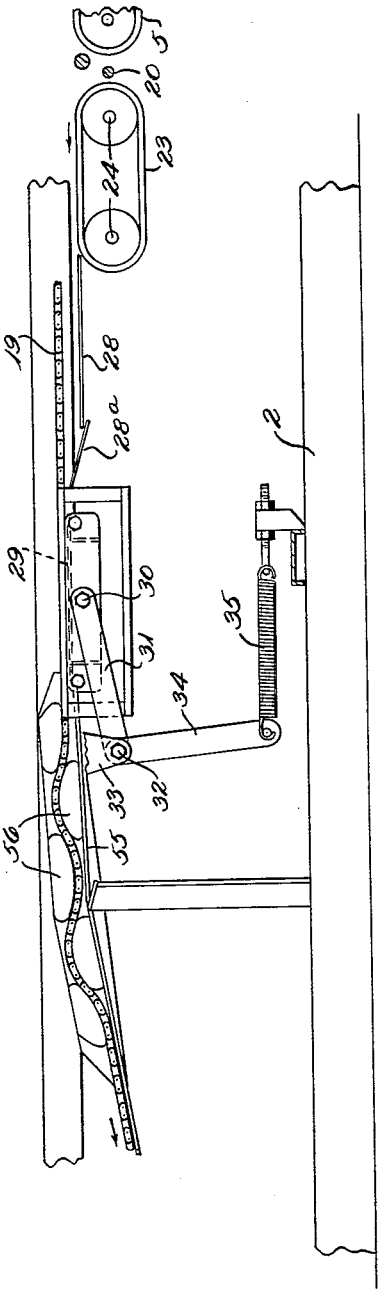

Dec. 5, 1961 B. G. COPPING 3,011,667
FULL DEPTH BOTTLE UNCASER
Filed June 10, 1957 6 Sheets-Sheet 3

INVENTOR.
BRUCE G. COPPING
BY Oldham & Oldham
ATTYS.

INVENTOR.
BRUCE G. COPPING

INVENTOR.
BRUCE G. COPPING
BY Oldham & Oldham
ATTYS.

Dec. 5, 1961  B. G. COPPING  3,011,667
FULL DEPTH BOTTLE UNCASER
Filed June 10, 1957  6 Sheets-Sheet 6
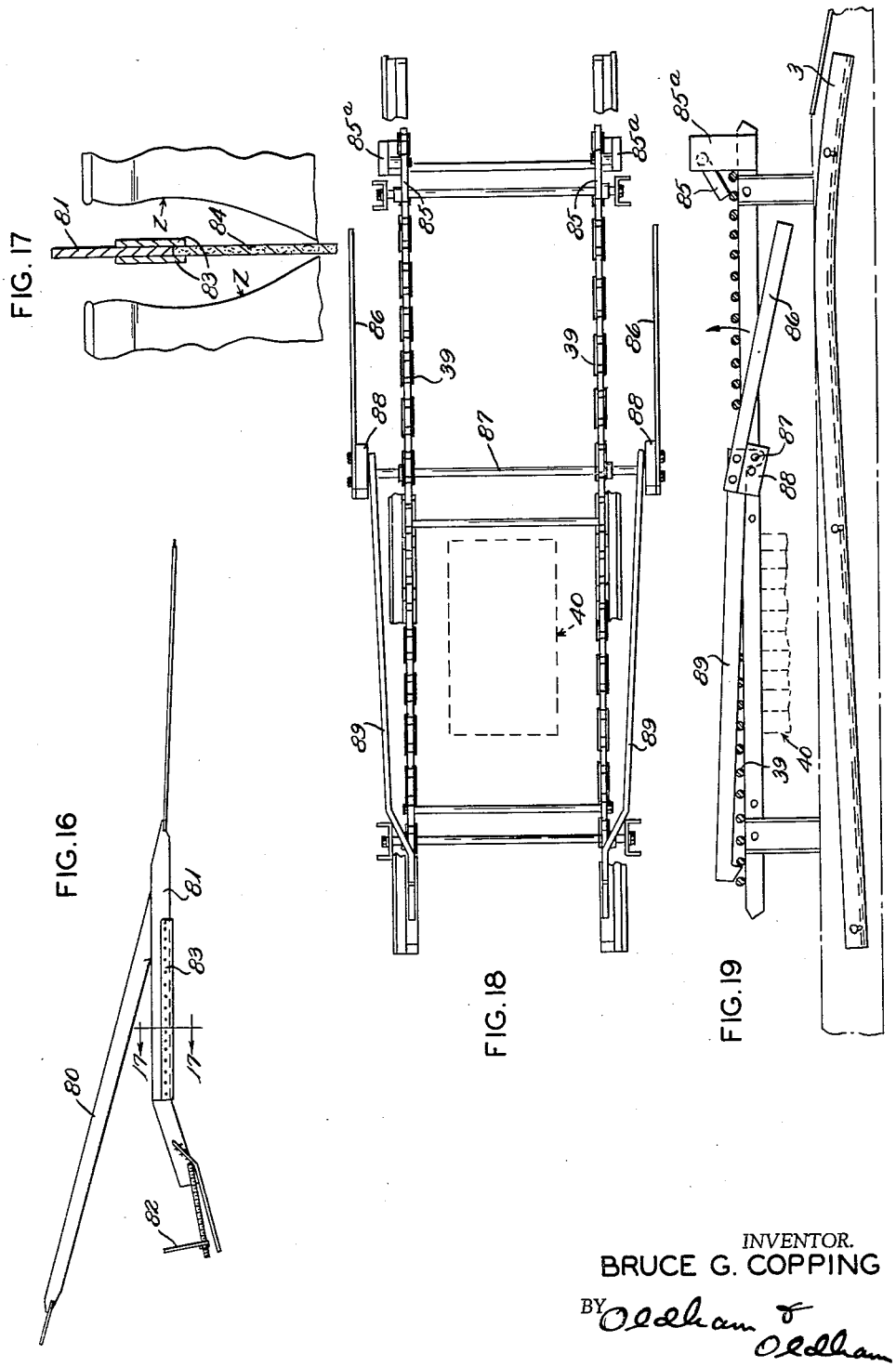
INVENTOR.
BRUCE G. COPPING
BY Oldham & Oldham
ATTYS.

United States Patent Office 3,011,667
Patented Dec. 5, 1961

3,011,667
FULL DEPTH BOTTLE UNCASER
Bruce G. Copping, Akron, Ohio, assignor to Atkron, Inc., Cuyahoga Falls, Ohio, a corporation of Ohio
Filed June 10, 1957, Ser. No. 664,755
11 Claims. (Cl. 214—304)

This invention relates to automatic machinery for unloading bottle containing cases or crates where the cases extend above the bottles therein and where the crates or cases usually have top flap covers thereover.

The present invention comprises an improvement over the bottle crate unloading machine disclosed in U.S. Letters Patent No. 2,696,927, which is designed for use in unloading bottle cases or crates wherein the bottles extend above the tops of the crates.

In the present apparatus, bottle engaging members disclosed in Brian Copping's U.S. Letters Patent No. 2,759,593 are used for engaging the bottles by the apparatus of the invention.

It is a well recognized business principle that, wherever possible, labor costs should be reduced, or eliminated, in any large scale business operation and that such savings are the best field of cost reduction. In soft drink and beer businesses today, tremendous numbers of bottles are handled by the bottling concerns and a large number of employees would be required merely to remove empty bottles from the cases returned to the bottling concerns for washing and refilling operations, or other processing. Hence, it is very desirable that automatic apparatus be provided wherever possible for handling this large number of bottles and bottle cases returned to the bottlers for further use.

It is therefore the general object of the invention to provide automatic machinery of the class indicated for removing empty bottles from cases wherein the bottles terminate below the upper margins of the case.

Another object of the invention is to provide means for automatically controlling the flow of bottle containing cases to the apparatus of the invention and wherein movement of cases towards or into the apparatus of the invention is controlled by a stop member and means for releasing the cases individually for flow into the apparatus of the invention in timed relation to movement of carrier conveyors through the apparatus.

A further object of the invention is to provide a special accelerated speed conveyor at the input end of the apparatus of the invention to facilitate proper movement of a case into engagement with the primary case moving conveyor means of the apparatus.

Another object of the invention is to provide a resilient support platform in the apparatus of the invention at a bottle engaging station provided therein wherein bottle engaging members are brought into engagement with the empty bottles for removing them from their carrier cases and wherein such resilient support platform can be depressed by the bottle engaging fingers or members should any bottles in the case be inverted and improperly contact such members.

Further objects of the invention include the following: to provide a plow member for opening top flaps on bottle cases and which plow member is pivotally positioned for movement to an inoperative, apparatus stopping position should any cases moving past the plow member be improperly positioned; to provide two coordinated driven conveyors in the apparatus of the invention, one for moving cases through the apparatus and the other for moving groups of bottle engaging members into the path of movement of the cases for engaging bottles therein and for withdrawing them from the cases on separating movement of the two conveyors; to retard movement of the main drive conveyor and the cases propelled through the apparatus thereby as the bottles are being removed from the cases by the separating movement of the two primary conveyors of the apparatus; to provide removable conveyor sections for securing the bottle engaging members in a conveyor for ready change should the apparatus be used with an altered type of case having different positioning of bottles or different numbers of bottles therein; to provide vertical adjustment in the apparatus for one of the primary carrier conveyors of the apparatus to permit the apparatus to be adapted for handling bottles of various heights, but yet to maintain correlated portions of the two primary conveyors in the apparatus at desired relationships to each other; to provide a special tread mill, or control cam for opening the bottle engaging members carried by one conveyor of the apparatus as such bottle engaging members move to a bottle engaging station in the apparatus; and to provide means for physically separating bottles and cases on separating movement of the two primary conveyors in the apparatus.

The foregoing and other objects and advantages of the invention will be made more apparent as the specification proceeds.

For a better understanding of the invention, reference should be had to the accompanying drawings wherein:

FIG. 1 is a side elevation of automatic bottle removing apparatus embodying the principles of the invention;

FIG. 2 is an enlarged fragmentary plan of a portion of the apparatus taken on line 2—2 of FIG. 1;

FIG. 3 is an enlarged fragmentary vertical section taken on line 3—3 of FIG. 2;

FIG. 4 is an enlarged plan view of the lower or case moving conveyor and associated means of the apparatus of the invention;

FIG. 5 is an enlarged detail of the resilient case support at the bottle engaging station and of the means for retarding forward movement of cases;

FIG. 16 is a side elevation of the novel and case separating member of the invention apart from the other portions of the apparatus;

FIG. 17 is an enlarged fragmentary vertical section taken on line 17—17 showing how the divider member of FIG. 16 engages a partition member or section in a case being processed;

FIG. 18 is a fragmentary plan view of a portion of the upper conveyor and frame means of the apparatus of the invention and which has means associated therewith for securing the upper conveyor in a fixed position for permitting the removal of a conveyor section therefrom; and FIG. 19 is a side elevation of the conveyor securing apparatus of FIG. 18.

Figure 6:
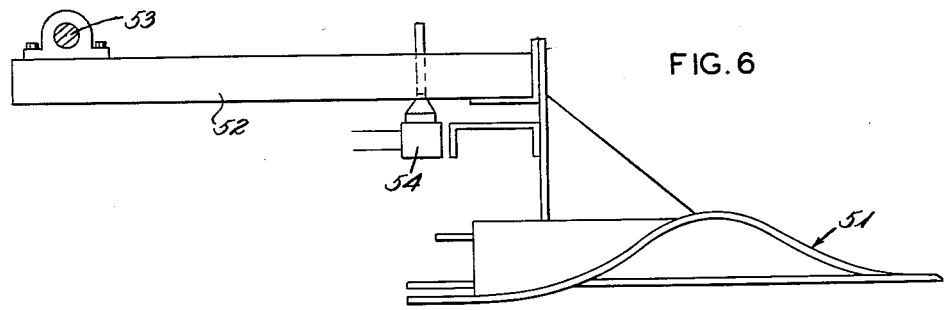
FIG. 6 is a detail enlarged side elevation of the plow means and positioning means provided therefor for opening the top flaps of cases fed to the apparatus of the invention.

It should be realized that the apparatus of the invention can be used with any desired styles of cases, which cases may have end flaps thereon although the cases shown have only side flaps thereon. Thus, additional means may be provided in the apparatus of the invention, if necessary, to either automatically or manually open any end flaps provided in the cases being processed.

When referring to corresponding parts shown in the apparatus of the invention and referred to in the drawings, corresponding numerals are used to facilitate comparison between such equivalent members.

The machine of the invention, in general, relates to apparatus for removing bottles from cases where the tops of the bottles are below the tops of the cases, and the novel apparatus comprises a continuously driven conveyor with means thereon for engaging cases and moving such cases along a predetermined path, a second continuously driven conveyor, bottle engaging members on the second conveyor and movable thereby through a path to intersect cases in the predetermined path of the first conveyor, means for feeding cases in the first conveyor in predetermined spaced relation, the bottle engaging members being brought into the cases from the tops thereof at an engaging station, resilient support means for the cases at the engaging station for downward movement of a case should a bottle therein be inverted and be contacted by a bottle engaging member, the second conveyor thereafter being separated from the first conveyor after passing the engaging station to remove bottles from the cases by the bottle engaging members, and additional means are provided for releasing bottles from the second conveyor after the bottle engaging members have moved the bottles from one of the processed cases. The apparatus of the invention also includes various other features and means, the details of which will be described hereinafter.

General sections of apparatus

The bottle uncasing apparatus of the invention is indicated as a whole by the numeral 1. This apparatus 1 includes a lower frame 2 and an upper frame 3. A conventional electric motor 4 is carried by the lower frame 2 and provides drive for all movable apparatus or conveyors of the apparatus 1 of the invention. An infeed section is indicated in the apparatus by the letter A, a bottle engaging station is indicated at the letter B, while a discharge section or station is indicated at C.

Infeed means

An infeed conveyor 5 is suitably journalled on spaced portions of the lower frame 2 at the input station A and such infeed conveyor is of any desired construction, in this instance being shown as comprising a pair of slot or bar type-endless bands adapted to receive and transport suitable cases or crates, indicated at 6, which have empty bottles therein. The cases normally have a pair of top flaps 7 provided thereon. The cases 6 are fed to the apparatus with the top flaps 7 in their closed positions and the apparatus 1 automatically opens or swings back such flaps while also automatically removing the empty bottles from the cases, as hereinafter described. A guide arm 8 is pivotally positioned on the lower frame 2 adjacent the infeed conveyor 5 and extends longitudinally thereof, which guide arm 8 is urged laterally inwardly of the input conveyor 5 by means of a spring 9 that engages a bracket 10 secured to and extending from a base end portion of the guide arm 8. The opposite end of the spring 9 is secured under tension to the lower frame 2 so that the spring continually urges the guide arm 8 out into the lateral margin of the infeed conveyor 5 for forcing any cases 6 thereon over to the opposite lateral margin of the input conveyor 5 at which position it contacts an edge guide 5a at the margin of the infeed conveyor 5. Channels 11 and 11a support the infeed conveyor 5 and extend for substantially the length of the lower frame 2 at the top thereof.

Means are provided for feeding the cases 6 on the remainder of the apparatus in a predetermined timed relation to the movement of the other members in and through the apparatus. Thus, a cam type of a release arm 12, FIG. 3, is positioned adjacent the channel 11a at the discharge portion of this infeed conveyor 5. Such release arm 12 is carried by a vertically extending shaft 13, FIG. 3, that is journalled on the lower frame 2 and which has a suitable bevel gear 14 secured to the lower end thereof. Such gear 14 engages a similar beveled gear 15 on a drive shaft 16 journalled on the lower frame 2. The drive shaft 16 is connected to the general drive mechanism of the apparatus, as described hereinafter in more detail. A stop 17 is carried by the lower frame 2 immediately adjacent the channel 11a and above the conveyor 5. All cases 6 moving into the apparatus on the infeed conveyor 5 will be forced against this stop 17 by the guide arm 8. However, the rotation of the release arm or cam 12 will cause the cases 6 to be released from engagement with the stop 17 in properly timed sequence to the remainder of movement of conveyor feed means in the apparatus 1 of the invention.

Case moving and supporting means

FIGS. 4 and 5 of the drawings best show the bottle case moving and supporting means provided in the lower frame 2 and associated means in the apparatus 1 of the invention. The primary conveyor means in the apparatus comprise a first continuously driven conveyor 18 that serves to engage and move cases 6 through the apparatus. The conveyor 18 is endless and it comprises two edge chains 19 that are looped to extend in circuits around the apparatus for moving the cases 6 therethrough. The edge chains 19 are supported on suitable tracks on the lower frame 2. In this particular embodiment of the invention, case engaging means comprising transversely extending bars 20 are secured to and extend between the pair of edge chains 19. The edge chains 19 are positioned by a suitable sprocket 21 on a support shaft 22 journalled in the lower frame 2 at one end of the conveyor and by a guide plate 21a at the other end. The conveyor 18 may have any suitable takeup means associated therewith, and the conveyor is shown extending around a drive sprocket (not shown) secured to a drive shaft 62 that is journalled on the lower frame 2 of the apparatus.

FIG. 4 of the drawings clearly indicates that one end of the conveyor 18 is positioned immediately adjacent the discharge end of the infeed conveyor 5 for receiving cases 6 therefrom. In order to facilitate the feeding or entry of cases into engagement with the conveyor 18, a special speeder conveyor 23 is provided within the looped, predetermined path of the conveyor 18 immediately adjacent the infeed end. The speeder conveyor 23 is made up from suitable members such as a pair of chain belts which are suitably positioned by pulleys (not shown) carried by shafts 24, 24 journalled in a pair of carrier bars 25 adjacent lateral margins of the lower frame 2. The carrier bars 25, 25 are positioned in a conventional manner intermediate the channels 11 and 11a, as by means of support bars 26, 26. A conventional drive sprocket 27 is secured to one of the positioning shafts 24, 24 and connects to the drive means of the apparatus by suitable chain or gear means, as desired. In all events, the drive for the sprocket 27 and speeder conveyor 23 moves that conveyor at the speed of approximately 1½ times that of the conveyor 18 that normally moves at the same speed as the infeed conveyor 5. The function of the speeder conveyor 23 thus is to accelerate the movement of a case 6 released from the infeed conveyor 5 to move such case rapidly into the path of movement of one of the transverse bars 20 on conveyor 18. Hence, the transverse bar can engage the back end of the case for moving it through the controlled path determined by the conveyor 18.

*Bottle engaging station and means*

From the speeder conveyor 23, the cases 6 are pushed over a carrier plate 28 and up an inclined end plate 28a to a support platform 29. As a feature of the present invention, the support platform 29 is resiliently positioned in the apparatus 1 and normally is also pivotally supported therein. Thus the support platform 29 is journalled on a center support shaft 30 extending transversely of the lower frame 2, which center shaft 30 is secured to a pair of support arms 31 at the ends of such center shaft. These support arms 31 are welded or otherwise secured to a support bar or rod 32 carried by the lower frame 2, as by means of brackets 33. Control arms 34 are also secured to this rod 32 and have resilient members, such as coil springs 35 secured to the opposite ends thereof, which coil springs are suitably anchored at their other ends to the lower frame 2. Thus, the springs 35 resiliently position or support the support platform 29 in the position indicated in the apparatus, but with such support platform being depressible as a whole, or being able to float or rotate slightly on the center shaft 30. Hence, if bottles are positioned improperly in the cases 6, the bottle engaging members in the apparatus, as hereinafter described, can contact the upended bottles and merely force such bottles and associated case means downwardly in the apparatus to prevent any damage to the cases, bottles, or to the apparatus.

Figure 9:
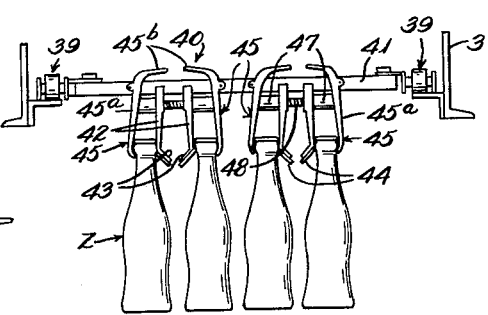
FIG. 9 is a fragmentary vertical section taken on line 9—9 of FIG. 1 after the bottles have been engaged by the bottle engaging members.
Figure 10:
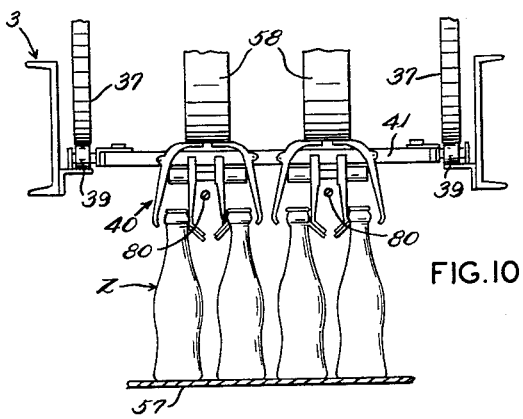
FIG. 10 is a fragmentary vertical section taken on line 10—10 of FIG. 1 to show the release of bottles by the apparatus of the invention.
Figure 11:
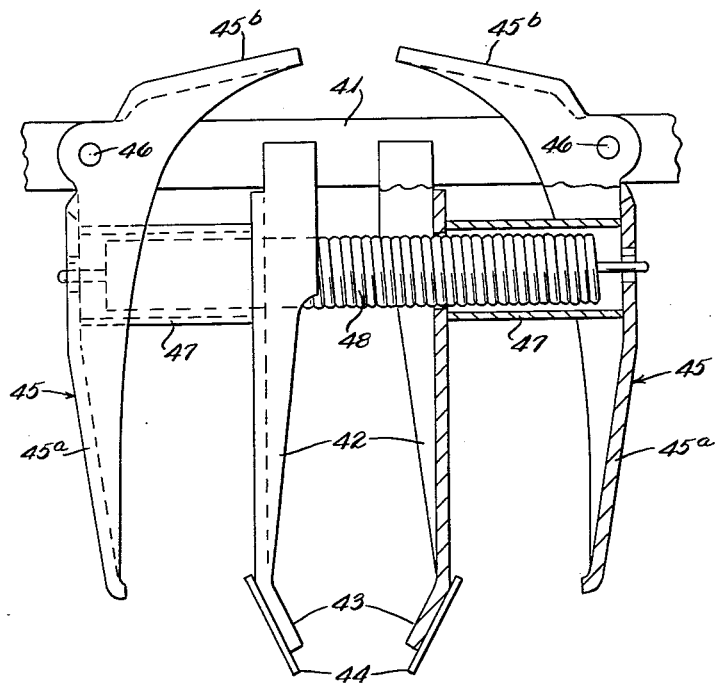
FIG. 11 is an enlarged elevation, partially broken away and shown in section, of two pairs of bottle engaging members of the invention.

It is at this bottle engaging station B that bottle engaging members are brought into engagement with bottles Z in the cases 6 from the open top end portions thereof, thus a second continuously driven conveyor 36, or second principal conveyor is suitably journalled on the upper frame 3. This second main conveyor 36 may be positioned by suitable sprockets 37 carried by support shafts 38 journalled on the upper frame 3. It will be seen that this second driven conveyor 36 includes endless edge chains 39 and that, preferably at longitudinally spaced portions thereof, it has groups of bottle engaging members indicated as a whole by the number 40 provided thereon. The bottle engaging members 40 are positioned on means extending transversely between the pairs of chains 39. These bottle engaging members 40 are of the general construction disclosed in United States Letters Patent No. 2,759,593 and comprise transverse bars 41 adapted to be secured to and extend between the chains 39 of the second conveyor 36. The bars 41 have two units of grasping members secured thereto and each unit has a pair of fixed finger elements 42 secured thereto, as best shown in FIG. 11, and extending downwardly therefrom in spaced relation. The lower ends of such fixed finger elements 42 are oppositely flanged at 43 and may carry special bottle engaging plates, or pads 44 thereon. Two fingers 45 of generally bell crank lever shape are pivotally secured to the bar 41 by pins 46, or equivalent members for each unit on the bar 41. These movable fingers 45 have dependent legs 45a which extend down to points adjacent the bottle engaging plates 44 on the fixed fingers 42. Control arms 45b are provided on the upper portions of these movable fingers 45a and extend towards each other for control of the positions of these movable fingers 45 as described in more detail hereinafter. Spacer sleeves 47 preferably are operatively associated with each of the fixed fingers 42, in alignment with each other to extend therefrom toward the associated movable fingers 45. A resilient control member, or coil spring 48 is secured to the pair of movable fingers 45 and extends therebetween through the spacer sleeves 47 and aligned holes or apertures formed in the fixed fingers 42, for resiliently urging the movable fingers 45 towards the fixed fingers for normally being in bottled engaging relation therewith. However, any forces applied to the control arms 45b to move them downwardly will, in turn, move the lower portions or lower arms 45a of these movable fingers outwardly to position them in bottle releasing positions, at which positions they also can be moved into engagement with bottles for ultimately being permitted to grasp such bottles when released. It will be seen that each unit of these bottle engaging members is adapted to grasp or engage two bottles and the drawings in FIGS. 8 through 10 indicate how two pairs of these bottle engaging members normally are positioned on each of the bars 41 secured to the second conveyor 36. It will be realized that a sufficient number of such bars 41 are provided and the fingers and bars are positioned thereon for engagement with bottles in a given size case. For example, there may be four longitudinally extending rows of bottles and six transversely extending rows of four bottles in one case. FIG. 1 of the drawings best indicates that usually a plurality of groups of the bottle engaging members 40 are provided at longitudinally spaced portions of the second conveyor 36 and with such groups of bottle engaging members being positioned in correlation to the transversely extending bars 20 of the first driven conveyor 18 so that the bottle engaging members will be in properly correlated positions to a case 6 being moved through the apparatus 1 by movement of the transverse bar 20.

Figure 8:
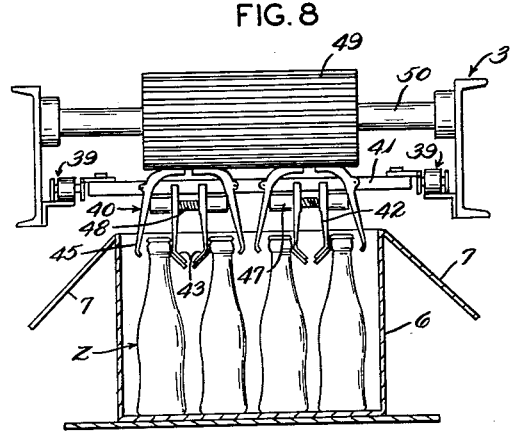
FIG. 8 is an enlarged vertical section taken on line 8—8 of FIG. 1 showing the bottle engaging members as brought into engagement with bottles in a case moving through the apparatus, and with the case end removed for clarity.

At this bottle engaging station B, suitable means are provided for engaging the control arms 45b of the movable fingers 45 in the bottle engaging members 40 as to move such fingers 45 to spaced relationship with the fixed fingers 42 for bottle engaging action. Thus, a treadmill conveyor or cam 49, as shown in FIG. 8, is provided. This treadmill cam 49 comprises an endless belt positioned on pulleys or equivalent means (not shown) carried by support shafts 50 journalled on the upper frame 3 at the bottle engaging station B. Such support shafts 50 position the treadmill cam for movement in a horizontal direction for pressure engagement with the control arms 45b of the movable fingers 45 for moving them to their bottle receiving positions, as indicated. Normally the engagement of the control arms 45b with the treadmill cam 49 will serve to rotate such cam so that no special drive means need be provided therefor. It thus will be seen that the second driven conveyor 36 must be positioned so that the bottle engaging fingers or members 40 will be brought into engagement with bottles in cases 6 being moved through the predetermined path by the first driven conveyor 18 so that the paths of movement of these conveyors will intersect. Usually it is desirable to move the cases upwardly into engagement with these bottle engaging members 40 to facilitate entry of the bottle engaging fingers into the opened tops of the cases 6. The inclined support plate 28a provides for such movement of the cases.

The cases 6 being moved into the apparatus 1 by the infeed conveyor 5 are opened by means of a conventional plow 51, FIG. 6, positioned on the upper frame 3 for normally extending in under the top flaps 7 of a case 6 and moving them to an open position by longitudinal movement of the case with relation to the plow. Guide plates 6b on the lower frame 2, FIG. 15, hold these top flaps 7 in their opened positions. Preferably this plow 51 is pivotally positioned on the upper frame 3 by means of a bar 52 secured to the plow and carried on a shaft 53 journalled on and extending between transversely spaced portions of the upper frame 3. This permits the plow 51 to be moved upwardly should any case 6 being fed into the apparatus be improperly positioned and have one of the transverse bars 20 of the first driven conveyor 18 rise up under such case prior to complete entry of the case into the orbit of the driven conveyor 18 for proper movement into and through the apparatus 1. If such plow 51 is forced to move upwardly by a case 6, it permits a resilient control switch 54, normally contacted and closed thereby, to open. This control switch 54 controls the main drive circuit of the apparatus 1 so that the operator of the apparatus will realize that something is wrong and correct the positioning of the case in the apparatus so that the plow 51 can return to its proper operating position. The control switch 54 is secured to the upper frame 3.

It will be realized that the length of the support platform 29 is correlated with the positioning of the treadmill cam so that the bottle engaging members 40 are in their proper opened positions when the fingers are inserted into a case and with the treadmill cam 49 then releasing the movable fingers 45 for bottle engaging action while the case 6 is still positioned so as to retain the bottles in proper relationship to the grasping end portions of the movable and fixed fingers 42 and 45. The end portions of the fixed fingers and movable fingers may have any grasping teeth, or other bottle engaging plates or means provided thereon, as is desired. Preferably the bottles in the cases 6 are of the type that have some type of bead, rib, or enlarged portion at the top thereof as this facilitates grasp of the bottles and suitable retention of the bottles in suspended positions by the bottle engaging members 40.

From the bottle engaging station B, the cases 6 preferably are moved onto a downwardly inclined support plate 55, while the path of the upper or second driven conveyor 36 is made to move upwardly at a diverging angle with relation to the support plate 55 to facilitate withdrawal of the bottles from the cases 6 by the different movements of the control conveyors and support means provided.

In order to prevent any disturbance between the case 6 and the bottles Z being pulled therefrom by relative movement of the conveyors and bottle engaging members 40, it is an important feature of the invention, that the conveyor 18 be provided with a serpentine path immediately following its passage by the bottle engaging station B. Thus, FIG. 5 illustrates that the lower frame 2 has a plurality of cam blocks 56 suitably secured thereto at each edge thereof, as to the inner surfaces of the channels 11 and 11a. These cam blocks 56 are positioned in vertically and longitudinally spaced relationship with each other to define a serpentine path through which the edge chains 19 of the conveyor 18 must move in order to retard forward movement of the conveyor 18 and to facilitate withdrawal of the bottles from the cases without any interference from the case as it is being moved continuously through the apparatus 1. The bottles Z usually are retained in the case 6 by cardboard partitions and it is very desirable that the bottles be lifted in a substantially vertical direction and have their axes extending vertically as pulled from the case. Retarding forward movement of the conveyor 18 facilitates convenient bottle removal action.

Discharge zone

At the discharge end of the apparatus 1, cases 6 having all bottles removed therefrom will move down the inclined support plate 55 to the end of the first driven conveyor 18 and be deposited onto an additional conveyor, or be otherwise removed from the apparatus 1, as desired. The second driven conveyor 36 with the bottles 6a suspended from the bottle engaging members 40 thereon are moved through a predetermined path adjacent a discharge conveyor 57. Such discharge conveyor 57, or chute, or equivalent member, is positioned in any suitable manner and may comprise an endless belt. As shown in FIG. 10, a pair of control or release pulleys 58 are provided and they are adapted to press against the control arms 45b of all of the pairs of movable fingers 45 provided in the bottle engaging members of the invention as the conveyor 36 rotates. Such control pulleys 58 then are adapted to effect release of bottles being carried by the associated pairs of fixed and movable fingers and effect deposit of the bottles in an upright position on the discharge conveyor 57 for passing to other apparatus for washing or other bottling, or processing operation, as desired.

Upper conveyor positioning and drive

The upper frame 3 is positioned upon a plurality of vertically extending support shafts or rods 59. These support shafts 59 are suitably carried by and journalled on the lower frame 2 as by means of bearings 60 and may have a control chain 61 secured to drive sprockets (not shown) secured to each of the support shafts adjacent the lower end thereof. Thus, the control chain 60 extends between and controls all support shafts 59 provided for positioning the upper frame 3 and facilitates unitary rotation of the support shafts by any suitable member engaged with one of the support shafts for turning it. The upper frame 3 is supported on the support shafts 59 by threaded upper ends of the support shaft engaging tapped support collars (not shown) secured to the upper frame 3 for retaining such frame in desired vertical relationship to the lower frame 2.

Figure 7:
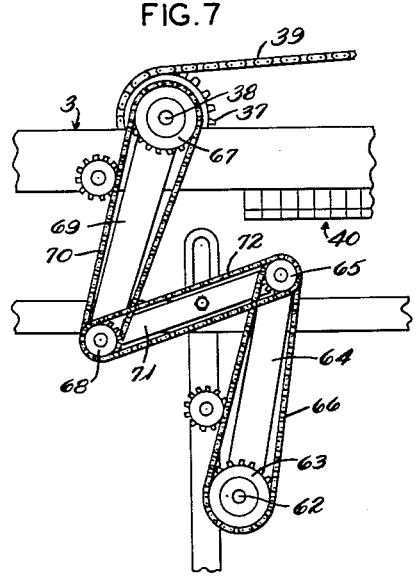
FIG. 7 is a detail side elevation showing the connection of the drive means between the lower and upper frame portions of the apparatus of the invention.

From the foregoing, it will be realized that groups of or individual bottle engaging members 40 must be positioned by the second driven conveyor 36 in accurately controlled relationship to the transverse bars 20 on the first conveyor 18 for proper engagement with cases being moved through the apparatus by the first conveyor 18. Hence, a special drive means has been provided for the upper and lower conveyors, and this mechanism is shown in FIG. 7 of the drawings. It maintains the two conveyors in proper correlated relationship to each other even though the position of the upper frame 3 is varied vertically with relation to the lower frame 2. To this end, the main drive from the motor 4 is transferred to a shaft 62 suitably journalled on the lower frame 2. Such shaft 62 has a drive sprocket 63 thereon. A control link 64 is journalled on the shaft 62 or is otherwise pivotally associated with the lower frame 2, and such link 64 journals a pair of axially aligned sprockets indicated at 65, on a common stub shaft on the link 64. One of such sprockets 65 is engaged by a chain 66 which engages the drive sprocket 63 on the shaft 62. A second drive sprocket 67 is secured to the shaft 38 on which a portion of the second driven conveyor 36 is positioned for suitable drive by means of the sprocket 37 carried thereon. Drive is transmitted to such sprocket 67 on the shaft 38 from one of a pair of sprockets 68 journalled on a control link 69. The sprockets 68 are unitary in action, like sprockets 65. The control link 69 is pivotally associated with or carried by the shaft 38 for limited pivotal movement with relation thereto. A chain 70 is used for transmitting drive between one of the sprockets 68 and the sprocket 67 for transmittal of power to the shaft 38. The pairs of sprockets 65 and 68 are also in journalled engagement with a control arm 71 that is pivotally and usually vertically adjustably carried by the lower frame 2. Such control arm 71 has a connection and driven sprocket chain 72 extending between the remaining sprockets of each of the pairs of sprockets 65 and 68 so that a complete driven connection is provided between the driven sprocket 63 on the lower frame and the sprocket 67 on the control shaft for the second driven conveyor 36. Thus on vertical adjustment of the upper frame 3 with relation to the lower frame 2, the sprocket and chain means connecting the drives for the conveyors 18 and 36 together will have slight and equivalent movement of both of such conveyors on such vertical adjustment of the upper frame. Hence, the conveyors 18 and 36 will have corresponding portions thereof maintained in the same relative positions by limited pivotal movement of the control links 64 and 69 and of the control arm 71. Any desired idler means may be provided in association with these drive chains to maintain them in tight engagement with their associated sprocket means.

Figure 12:
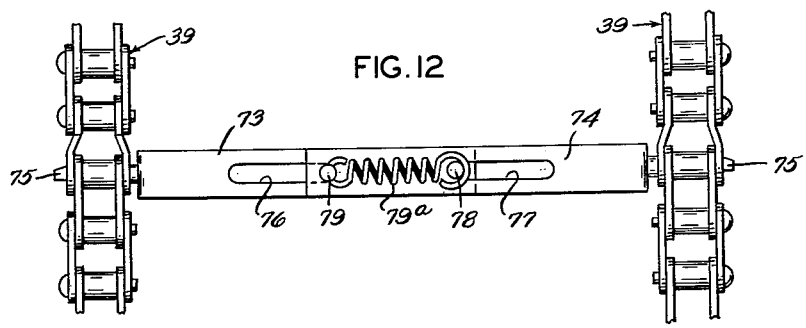
FIG. 12 is a fragmentary plan showing a connector member extending between the side chains of the upper conveyor means in the apparatus of the invention.
Figure 13:
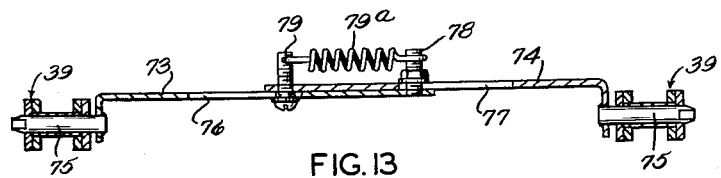
FIG. 13 is a vertical section of the conveyor chain connector member of FIG. 12.

So as to facilitate change of the apparatus 1 of the invention from use with cases of a given size and arrangement of bottles therein over to use with another style of a case, it is very desirable that the bottle engaging members be readily removable therefrom. Thus, rather than endeavor to change the relative positions of the bottle engaging members on the second main conveyor 36, I have provided special, easily removable lock bars at the ends of the groups of bottle engaging members carried by the second conveyor 36. Thus, a pair of telescopically engaged lock bars 73 and 74 extend between the conveyor or chains, FIG. 12, and they carry pins 75 at the ends thereof for engaging links of the conveyor chains 39 to hold links in engagement with each other. Each of these lock bars 73 and 74 has a slot 76, or 77, respectively, therein and with a threaded stud 78 and a capscrew 79 being carried by each one of the lock bars 73 and 74 and extending through the associated slots provided in the opposite lock bar. The lock bars 73 and 74 are urged towards their extended positions by a spring 79a engaging the stud 78 and capscrew 79, but with the lock bars being quickly releasable by pulling one lock bar axially towards the other. Such movement of the associated lock bars would release one of the lock pins 75. Entire sections of the chains 39 can be quickly removed therefrom by release of two sets of lock bars, as explained hereinafter. Likewise, new lengths of chains and arrangements of bottle engaging members can be positioned in these edge chains 39 on the second conveyor 36 and the apparatus be readily converted for use with different styles of cases from that with which the apparatus had previously been used.

Figure 14:
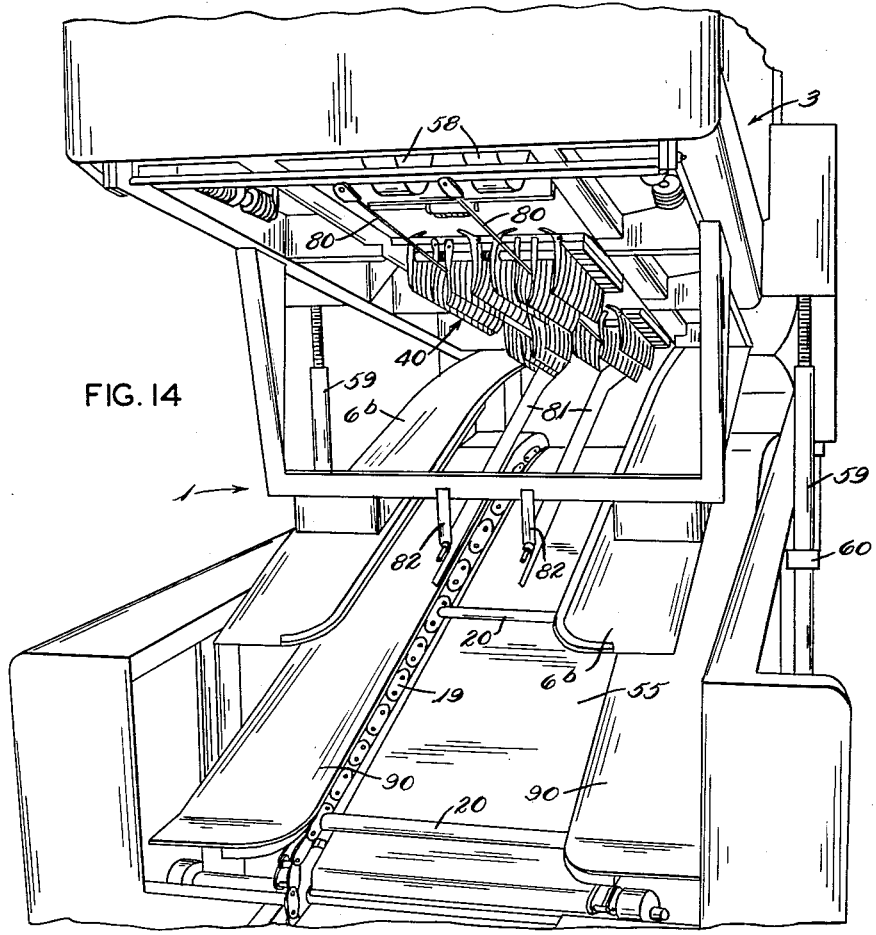
FIG. 14 is a fragmentary perspective view of the positive bottle and case separating means of the invention.

Preferably a pair or rods or guides 80, 80 are secured to the upper frame 3, as shown in FIG. 14, and extend from a point adjacent the discharge station C in the apparatus to a point adjacent the infeed end of the conveyor. These rods 80 extend between the fixed fingers 42 of the second driven conveyor 36, as such conveyor moves around its controlled path of movement, and the rods 80 have a pair of spaced guide bars 81 secured thereto to aid in separating members, such as cardboard six bottle carrier cases, from the cases 6 being processed. The pair of spaced guide bars 81 is positioned above the first conveyor 18 at the section thereof in which the support plate 55 is provided. The rods 80 and guide bars 81 are positioned to insure that the cases 6 and partition means, or smaller cases therein will move downwardly over the support plate 55 with the cases 6 and that the bottles Z can be lifted up out of the cases. The guide rods 80 and the guide bars 81, FIG. 16, are formed into a unit with each other by welding or otherwise suitably securing them together at a point adjacent the bottle engaging station B of the apparatus. Any desired means, usually adjustable, are used to secure the guide rod and bar assembly to the upper frame 3.

FIG. 17 shows additional details of this assembly of the guide rods 80 and bars 81 and it will be seen that a pair of extension straps or guides 83 are secured to the guide bars 81 and protrude downwardly from the lower surface of the guide bars 81. These extension guides 83 engage a cardboard partition member 84, or the like, which may form a portion of a six bottle carrier or the like, received in one of the cases 6 being processed by the apparatus of the invention. Inasmuch as the cases 6 being processed through the apparatus are guided laterally with relation to the apparatus, the partition member 84 provided in these cases, which means may be started to be lifted up above the cases as the bottles are being withdrawn therefrom will engage, normally, with this pair of extension guides 83. These guides 81 and 83 facilitate physical separation of the bottles from their carrying cases while the cases are being moved along the guides 81. Suitable supports 82 aid in positioning the guides 81 on the upper frame.

In order to facilitate changing the plurality of groups of bottle engaging fingers or members shown in the apparatus, the upper frame 3 pivotally positions a latch or stop arm 85 on a block or support 85a secured to the upper frame 3 at each margin of the conveyor 36. Control lever arms 86 are secured to a shaft 87 journalled on the upper frame 3 in spaced relation to these latches 85 longitudinally of the upper frame. The shaft 87 also has a pair of control arms or links 88 secured thereto and extending therefrom to which a pair of elongate chain hooks 89 are individually secured. Thus one chain hook 89 is connected to each of the links 88 which in turn has its position controlled by the lever arms 86 and their pivotal positions with relation to the upper frame 3. Each of the chain hooks 89 is adapted to engage one of the edge conveyor chains 39 of the second driven conveyor 36 when the lever arms 86 are in their raised, or elevated positions. Then, by swinging the lever arms downwardly to the positions shown in FIG. 19, the chain hooks 89 are caused to force a portion of the second driven conveyor 36 over towards the latches 85. This releases the tension on the particular portion of the second driven conveyor 36 between such chain hooks 89 and the latches, but holds the remainder of the looped edge chains of this conveyor in a fixed or given position. When this release of tension on a portion of the second driven conveyor is provided, then an operator of the apparatus can readily remove two associated pairs of support arms 73 and 74 from the conveyor and remove sections thereof. Thus, by removing a pair of such support bars at opposite ends of a group of the bottle engaging members, a new section of conveyor having the desired positioning or groups of bottle engaging members thereon can be inserted into the conveyor. Next the apparatus can be inched ahead to position a new set of bottle engaging members for engagement by the chain hooks 89 and associated means so that all of the groups of bottle engaging members can be readily changed and adapt the apparatus to handle a different style or size of bottle crates or cases.

Figure 15:
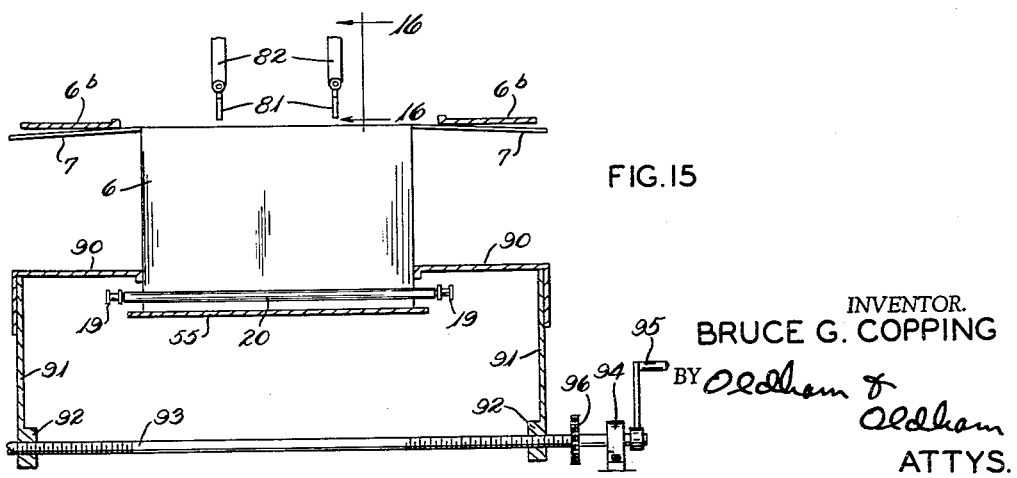
FIG. 15 is a fragmentary vertical section taken on line 15—15 of FIG. 1 of the case moving and engaging portion of the apparatus and the lateral guides therein.

FIGS. 1 and 15 of the drawings best show that a pair of case guides 90 can be associated with the lateral portions of the lower frame 2 to define a case receiving path in the apparatus. Thus, these case guides extend substantially the length of the first driven conveyor 18 and are positioned on suitable support arms or brackets 91, 91. These brackets, in turn, are carried by tapped collars or sleeves 92 to position these case guides 90 for adjustment of their positions laterally with relation to the remainder of the apparatus. The positioning collars 92 are threadably engaged with threaded support shafts 93, 93, a pair of which are journalled at longitudinally spaced positions on the lower frame 2. The shafts 93 obviously have pairs of threads on opposite end portions thereof, which threads extend in opposite directions for unitary control of the positions of the case guides 90. Thus, FIG. 15 shows that the shafts 93 can be journalled on bearings 94 on the lower frame and with a control handle 95 being shown for clarity in FIG. 15, although actually associated with the opposite one of the shafts 93 from that shown in FIG. 15. The shafts 93 are connected to form an operative unit by means of sprockets 96 secured to each one of the shafts and a chain 97 extending between and engaging the sprockets 96 for concurrent and unitary rotation of the shafts 93 to move the case guides 90 laterally in the apparatus and adjust them to a desired width for cases to be processed therein.

With reference to the drive means used in the apparatus of the invention, the motor 4 normally will connect through a suitable speed reducer unit to an output pulley 98 or equivalent member, which is suitably connected to and drives a pulley or sprocket 99, FIG. 1, secured to the shaft 62. The edge chains 19 for the lower or first conveyor 18 thus both can be led to suitable drive sprockets also carried by the shaft 62 for drive of the first conveyor. The drive means for the infeed conveyor 5 and for the speeder conveyor 23 can be suitably connected to this drive shaft 62, or to other driven means in the apparatus so as to have such members driven in properly correlated speeds with relation to the remainder of the apparatus. Likewise, drive for the shaft 16 for controlling the release arm 12 can also be taken from this shaft 62, or other associated driven means, in the apparatus so that all of the moving means in the apparatus 1 of the invention are controlled by one drive motor. This aids materially in maintaining the speeds of the various portions of the apparatus in complete correlation with each other after once being initially set up with proper sprocket diameters, number of teeth, etc. so as to obtain the initial speed and other correlations desired.

From the foregoing, it will be seen that a fully automatic type of a bottle removing apparatus has been provided for withdrawing bottles from cases wherein the cases extend beyond the tops of the bottles and which cases may have top flaps thereon. The apparatus is safe to operate and is adapted to process a large number of cases through it in a minimum amount of time and with no damage done to the bottles, cases, or other means handled by the apparatus of the invention.

While one complete embodiment of the invention has been disclosed herein, it will be appreciated that modification of this particular embodiment of the invention may be resorted to without departing from the scope of the invention as defined in the appended claims.

What is claimed is:

1. In a machine for removing bottles from cases where the tops of the bottles are below the tops of the cases, the combination comprising a continuously driven open centered conveyor with means thereon for engaging cases and moving them along a predetermined path, a second continuously driven coveyor having spaced groups of bottle engaging members thereon movable through a path to intersect the cases in said predetermined path, a said group of bottle engaging members being brought into said cases from the tops thereof at an engaging station, resilient support means for said cases at said engaging station and independent of said conveyors for downward movement of a case should a bottle therein be inverted and be contacted by said bottle engaging members, said second conveyor being separated from said first conveyor after passing said engaging station to remove bottles from the cases, support means for the cases passing to and from said resilient support means, and means for leading said first conveyor through a serpentine path to retard its forward movement after passing said engaging station while said second conveyor and bottle engaging members are withdrawing bottles from a case being moved by said first conveyor.

2. In a machine for removing bottles from cases where the tops of the bottles are below the tops of the cases, the combination comprising a frame, a continuously driven open centered conveyor with means thereon for engaging cases and moving them along a predetermined path on said frame, a second continuously driven conveyor, bottle engaging members on said second conveyor and movable through a path to intersect the cases in said predetermined path, said bottle engaging members being brought into said cases from the tops thereof at an engaging station to engage the bottles therein, said second conveyor being separated from said first conveyor after passing said engaging station to remove bottles from the cases, and means on said frame for leading said first conveyor through a serpentine path to retard its forward movement after passing said engaging station while said second conveyor and bottle engaging members are withdrawing bottles from a case being moved by said first conveyor.

3. In a machine for removing bottles from cases where the tops of the bottles are below the tops of the cases, the combination comprising a continuously driven open centered conveyor with means thereon for engaging cases and moving them along a predetermined path, and a second continuously driven conveyor having spaced groups of bottle engaging members thereon movable through a path to intersect the cases in said predetermined path, a said group of bottle engaging members being brought into said cases from the tops thereof at an engaging station; said second conveyor including a pair of endless side chains, said bottle engaging members being secured to and extending between said side chains, and releasable transversely telescopically engaged lock bars extending between said side chains at both ends of said groups of bottle engaging members to secure them in and to said side chains to form portions thereof but to be releasable therefrom.

4. In apparatus as described, a lower frame, an upper frame, driven conveyor means on each of said frames, means positioning said upper frame means for adjustment with relation to said lower frame, a driven chain assembly pivotally secured at one end to one of said frames and driven in correlation with said conveyor means thereon, a driven chain assembly pivotally carried at one end by the other of said frames and connected to and driving said driven conveyor means thereon, and a driven chain assembly pivotally secured to one of said frames and connecting at opposite ends to the drives of said first two chain assemblies whereby said driven conveyor means are maintained in given correlation to each other by pivotal movement of all three chain assembles when said upper frame is moved relative to said lower frame.

5. In a machine for removing bottles from cases and having a frame, a continuously driven conveyor with means thereon for engaging cases and moving them along a predetermined path, and a second continuously driven conveyor having edge chains and spaced groups of bottle engaging members carried thereby and movable through a path to be moved into the cases moving through said predetermined path at an engaging station, the combination comprising latch means on said frame for engaging said edge chains on said second conveyor and preventing movement thereof in one direction, hook arms for engaging said edge chains at points remote from said latch means, and lever means connecting to said hook arms for pulling them towards said latch means to loosen a section of said second conveyor and to permit change of a section of edge chains thereof, said lever means being retained by gravity and the load forces applied thereto in conveyor engaging and loosening position.

6. In a machine for removing bottles from cases and having a frame, a driven conveyor with means thereon for engaging cases and moving them along a predetermined path, and a second driven conveyor having edge chains and spaced groups of bottle engaging members carried by such edge chains and movable through a path into the said predetermined path of said first conveyor at a bottle engaging station, the combination comprising latch means on said frame for engaging said second conveyor and preventing movement thereof in one direction, hook arms for engaging said second conveyor at points remote from said latch means, and lever means operatively connected to said hook arms for pulling them towards said latch means to loosen a section of said second conveyor intermediate said hook arms and latch means to permit change of sections of said conveyor and the members carried thereon.

7. In a machine for removing bottles from cases where the tops of the bottles are below the tops of the cases, the combination comprising a driven conveyor with means thereon for engaging cases and moving them along a predetermined path, a second driven conveyor, means operatively positioning said second conveyor adjacent said first conveyor, bottle engaging members carried by said second conveyor and movable through a path to intersect the cases in said predetermined path, said bottle engaging members being brought into said cases from the tops thereof at an engaging station to engage the bottles therein, said second conveyor being separated from said first conveyor after passing said engaging station to remove bottles from the cases, and means operatively positioning said first conveyor on said frame for leading said first conveyor through a serpentine path to retard its forward movement after passing said engaging station while said second conveyor and bottle engaging members are withdrawing bottles from a case being moved by said first conveyor.

8. In a machine for removing bottles from cases with top flaps thereon and with the tops of the bottles being below the tops of the cases, the combination comprising a driven conveyor with means thereon for engaging cases and moving them along a predetermined path, a second driven conveyor, bottle engaging members carried by said second conveyor and movable through a path to intersect the cases in said predetermined path, means for feeding cases to said first conveyor in predetermined spaced relation, said cases on said first conveyor having open top flaps, said bottle engaging members being brought into said cases from the tops thereof at an engaging station, and resilient support means for said cases at said engaging station and independent of said first conveyor for downward movement of a case should a bottle therein be inverted and be contacted by one of said bottle engaging members, said first conveyor being led through a serpentine path to retard its forward movement after passing said engaging station while said second conveyor and bottle engaging members are withdrawing bottles from a case being moved by said first conveyor.

9. In a machine for removing bottles from cases and having a frame, and a driven conveyor having edge chains and spaced groups of bottle engaging members carried by such edge chains and movable through a path with relation to the frame, the combination comprising latch means on said frame for engaging edge chains of said conveyor and preventing movement thereof in one direction, hook arms for engaging edge chains of said conveyor at points remote from said latch means, and lever means operatively connected to said hook arms for pulling them towards said latch means to loosen a section of said conveyor intermediate said hook arms and latch means to permit change of sections of said conveyor and the members carried thereon.

10. In a machine for removing bottles from cases with top flaps thereon and with the tops of the bottles being below the tops of the cases, the combination comprising a continuously driven conveyor with means thereon for engaging cases and moving them along a predetermined path, a second continuously driven conveyor, bottle engaging members carried by said second conveyor and movable through a path to intersect the cases in said predetermined path, means for feeding cases to said first conveyor in predetermined spaced relation, means for opening the flaps of the cases fed to said first conveyor, said bottle engaging members being brought into said cases from the tops thereof at an engaging station, and resilient support means for said cases at said engaging station and independent of said first conveyor for downward movement of a case should a bottle therein be inverted and be contacted by one of said bottle engaging members, said conveyor being led through a serpentine path to retard its forward movement after passing said engaging station while said second conveyor and said bottle engaging members are withdrawing bottles from a case being moved by said first conveyor.

11. In a machine for removing bottles from cases with top flaps thereon and with the tops of the bottles being below the tops of the cases, the combination comprising a continuously driven conveyor with means thereon for engaging cases and moving them along a predetermined path, a second continuously driven conveyor, bottle engaging members carried by said second conveyor and movable through a path to intersect the cases in said predetermined path, means for feeding cases to said first conveyor in predetermined spaced relation, means for opening the flaps of the cases fed to said first conveyor, said bottle engaging members being brought into said cases from the tops thereof at an engaging station, means engaging said second conveyor to position it in adjustable vertical relation to said first conveyor, common drive means for both of said conveyors, and means connecting said drive means to both of said conveyors, said drive means maintaining corresponding portions of said conveyors in the same relative positions with adjustment of said second conveyor's position, said last-named means including a drive assembly pivotally connected to said first conveyor, a second drive assembly pivotally connecting to said second conveyor, and a connecting drive assembly pivotally positioned adjacent one of said conveyors and connecting at opposite ends thereof to said first and second drive assemblies to connect said drive means continuously to both of said conveyors even with adjustment of the relative positions thereof.

References Cited in the file of this patent

UNITED STATES PATENTS

| | | |
|---|---|---|
| 1,148,954 | Carr | Aug. 3, 1915 |
| 2,213,774 | Taylor | Sept. 3, 1940 |
| 2,635,773 | Ardell | Apr. 21, 1953 |
| 2,656,060 | Fischer et al. | Oct. 20, 1953 |
| 2,681,161 | Lorenz et al. | June 15, 1954 |
| 2,696,927 | Copping | Dec. 14, 1954 |
| 2,758,731 | Davis | Aug. 14, 1956 |
| 2,771,202 | Meyer | Nov. 20, 1956 |